(12) United States Patent
Sorger et al.

(10) Patent No.: US 9,511,318 B2
(45) Date of Patent: Dec. 6, 2016

(54) FILTER ELEMENT WITH HAND GRIP ELEMENTS AND FILTER WITH A FILTER ELEMENT

(71) Applicant: MANN+HUMMEL GMBH, Ludwigsburg (DE)

(72) Inventors: Nadine Sorger, Stuttgart (DE); Michael Heim, Korntal-Münchingen (DE); Gelase Mbadinga Mouanda, Bietigheim-Bissingen (DE); Pascal Neef, Renningen (DE); Mario Rieger, Ludwigsburg (DE); Werner Blossey, Benningen (DE); Robert Hasenfratz, Waiblingen (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 52 days.

(21) Appl. No.: 14/329,968

(22) Filed: Jul. 13, 2014

(65) Prior Publication Data

US 2015/0013282 A1   Jan. 15, 2015

(30) Foreign Application Priority Data

Jul. 12, 2013   (DE) .................. 10 2013 011 611

(51) Int. Cl.
*B01D 46/42* (2006.01)
*B01D 46/52* (2006.01)
*B01D 46/00* (2006.01)
*F02M 35/024* (2006.01)
*F02M 35/02* (2006.01)

(52) U.S. Cl.
CPC ....... *B01D 46/4227* (2013.01); *B01D 46/0002* (2013.01); *B01D 46/521* (2013.01); *F02M 35/0203* (2013.01); *F02M 35/0245* (2013.01); *F02M 35/02416* (2013.01); *F02M 35/02491* (2013.01)

(58) Field of Classification Search
CPC . B01D 46/0002; B01D 46/10; B01D 46/4227; B01D 46/521; F02M 35/02416; F02M 35/0245; F02M 35/02491
See application file for complete search history.

(56) References Cited

U.S. PATENT DOCUMENTS

| | | | |
|---|---|---|---|
| 6,955,696 B1 | 10/2005 | Ost et al. | |
| 8,613,785 B1* | 12/2013 | Davis | B01D 46/00 55/357 |
| 8,915,985 B2* | 12/2014 | Dewit | B01D 46/0005 55/357 |
| 2003/0066425 A1* | 4/2003 | Shah | B01D 46/0004 95/273 |

(Continued)

FOREIGN PATENT DOCUMENTS

DE   202008002813 U1   7/2009

*Primary Examiner* — Robert Clemente
(74) *Attorney, Agent, or Firm* — James Hasselbeck (57) ABSTRACT

A filter element, in particular a flat filter element (10) for installation in a filter housing of a filter for a fluid, in particular an air filter, in particular for an internal combustion engine, in particular in a motor vehicle, and a filter are described. The filter element (10) comprises open filter bellows (16) made of a filter medium (18), which has an oncoming flow side (28) and an outgoing flow side (30) for the fluid to be filtered. The filter element (10) has at least two hand grip elements (46) for gripping the filter element (10).

9 Claims, 8 Drawing Sheets

(56) References Cited

U.S. PATENT DOCUMENTS

| | | | |
|---|---|---|---|
| 2003/0217534 A1* | 11/2003 | Krisko | B01D 45/12 55/337 |
| 2007/0169448 A1 | 7/2007 | Osborne et al. | |
| 2008/0110142 A1 | 5/2008 | Nelson et al. | |
| 2009/0044503 A1* | 2/2009 | Ammersdoerfer | B01D 46/0002 55/497 |
| 2011/0173937 A1 | 7/2011 | Nelson et al. | |
| 2012/0067013 A1 | 3/2012 | Antony et al. | |

\* cited by examiner

FILTER ELEMENT WITH HAND GRIP ELEMENTS AND FILTER WITH A FILTER ELEMENT

CROSS-REFERENCE TO RELATED APPLICATION

This application claims the benefit of German patent application No. 10 2013 011 611.2, filed Jul. 12, 2013, the aforesaid German patent application being incorporated in its entirety herein by reference.

TECHNICAL FIELD

The invention relates to a filter element, in particular a flat filter element for installation in a filter housing of a filter for fluid, in particular an air filter, in particular for an internal combustion engine, in particular for a motor vehicle, with an open filter bellows of a filter medium having an oncoming flow side and an outgoing flow side for the fluid to be filtered.

Furthermore, the invention relates to a filter for a fluid, in particular an air filter, in particular for an internal combustion engine, in particular in a motor vehicle, having a filter housing, which has at least one inlet and at least one outlet for fluid and with at least one filter element, in particular a filter element according to the invention, in particular a flat filter element, with open filter bellows made of a filter medium having an oncoming flow side and an outgoing flow side for the fluid to be filtered, wherein at least one filter element is disposed in the filter housing in such a way that it separates at least one inlet from at least one outlet.

PRIOR ART

WO 2012/175438 A1 describes a filter device with a plate filter element for filtering fresh air for an internal combustion engine of a motor vehicle. The filter element has a flat, planar, plate-shaped filter body, which has an edge that is disposed peripherally and laterally as well as encompassing a cross section of the filter body through which the flow can pass. The filter element is disposed in the interior of a filter housing. The filter device is preferably an air filter device for a motor vehicle in particular.

The invention is based on the object of designing a filter element and a filter of the type defined in the introduction in which installation of the filter element into the filter housing and/or dismantling of the filter element from the filter housing can be improved. It should in particular be possible to perform the installation and/or dismantling more easily and more reliably.

DISCLOSURE OF THE INVENTION

This object is achieved according to the invention with the filter element such that the filter element has at least two hand grip elements for gripping the filter element.

The filter element can be gripped easily on at least two hand grip elements. The hand grip elements may therefore be designed so that they can easily be gripped manually with one or two hands and/or by machine with the help of one or more suitable gripping tools. The terms "hold" and "grip" in the sense of the invention are understood in particular to refer to reaching around a section of the corresponding hand grip element as well as to one-sided touch or reaching into a corresponding section of the hand grip element.

At least two hand grip elements may advantageously be the same or similar with regard to their shape, dimensions, location and type of configuration on the filter bellows or connection to the filter bellows. Alternatively, at least two hand grip elements may be different with regard to shape, dimensions, location and/or type of configuration/connection. The symmetry or asymmetry of the filter element can be influenced in this way.

At least one of the two hand grip elements may advantageously have at least one section, in particular a cross section that can be gripped. This grip section may be held with one or more fingers and/or a corresponding gripping tool and thereby held in a stable manner.

In an advantageous embodiment, at least one of the two hand grip elements may have at least one hole or at least one finger hole or at least one grip opening or at least one recessed grip. The fingers of one hand and/or a corresponding gripping tool may engage in the hole, the finger hole, the grip opening or the recessed grip. Alternatively or additionally, at least one of the two hand grip elements may not have any hole, any finger hole, any grip opening or any recessed grip.

At least one hand grip element, in particular a recessed grip may advantageously be disposed in an outer circumferential side of the filter element, in particular the outside of any end body. At least one hand grip element may advantageously be disposed between the oncoming flow side and the outgoing flow side. At least one hand grip element may advantageously be disposed between a flow-through side, in particular the oncoming flow side of the filter bellows, and the circumferential seal, if any.

The grippable section, the hole or the finger hole may advantageously be situated upstream from the oncoming flow side or downstream from the outgoing flow side of the filter bellows with respect to the element axis in the direction of flow.

The use of at least two hand grip elements has the advantage that the filter element can be gripped simultaneously in several locations. The filter element may thus be installed in and dismantled from the filter housing equally. This reduces the risk to the pleat edges of the filter element during installation or dismantling. Thus even relatively heavy and/or large filter elements can be positioned easily and precisely in the filter housing.

At least one of at least two hand grip elements may advantageously be situated on a rear side of the filter element with regard to the direction of installation of the filter element in the filter housing. The rear side of the filter element may advantageously face away from the housing bottom of the filter housing. The rear side of the filter element may face an installation opening of the filter housing through which the filter element can be installed. At least one hand grip element can be gripped easily from the outside through the installation opening in this way after the filter housing has been opened.

The filter element may advantageously be suitable for filtering air. It may also be provided for filtering other types of fluids, in particular gases or liquids. A corresponding filter element may thus also be used for filtering fuel, oil, water or urea solution in particular.

The filter element may advantageously be used in an internal combustion engine in a motor vehicle.

The filter element may advantageously be disposed in an air filter of a commercial vehicle, in particular a truck, a bus, a construction site vehicle or an agricultural machine. Such filter elements may be of larger dimensions in comparison with filter elements for passenger vehicles. However, the filter element may also be used in passenger vehicles.

The invention may also be used outside of automotive engineering, in particular in industrial motors. Use of the invention outside of internal combustion engines, in particular in automotive engineering is also possible.

In the case of an open filter bellows in the sense of the invention, the filter medium is not closed to form a hollow body. In contrast with that, the filter medium in a hollow filter element, in particular a so-called round filter element is closed on the periphery and surrounds an interior.

The filter element may advantageously be a flat filter element. The filter element may be flat or curved. The oncoming flow side and/or the outgoing flow side of the filter bellows may be flat or curved. The filter element may also be box shaped.

The filter bellows may be approximately in the shape of a polyhedron, for example. The filter bellows may advantageously be cube-shaped, cuboid, pyramidal, prismatic, wedge-shaped or the like. It is not necessary for all sides of the filter bellows to be flat. Some of the sides of the filter bellows may also be curved. Opposite sides may run in parallel. Alternatively or additionally, they may also run obliquely or be otherwise not parallel to one another.

An element axis of the filter element may advantageously be parallel or axial to the installation direction of the filter element in the filter housing. The dismantling direction is usually opposite the installation direction. The element axis may advantageously intersect with the oncoming flow side and the outgoing flow side of the filter element. In the case of a planar oncoming flow side and/or a planar outgoing flow side, the element axis and/or the installation direction may advantageously run perpendicular thereto.

The filter medium may be a filter paper, a filter nonwoven, a meltblown, a woven fabric or some other type of filter medium that is suitable for filtering fluid, in particular air. The filter medium may advantageously be pleatable.

Alternatively, the filter bellows may also comprise a fluid-permeable filter foam, in particular an air-permeable filter foam. The filter bellows may be implemented as a solid block of such a filter foam.

In another advantageous embodiment, at least two hand grip elements may be disposed on opposite sides of filter element.

The filter element may be gripped uniformly on opposite sides in this way. The risk of tilting of the filter element during installation or dismantling can therefore be further reduced.

At least two hand grip elements may advantageously be disposed on opposite sides of the filter element with respect to the axis of the element.

The hand grip elements may advantageously be disposed in pairs.

In another advantageous embodiment, at least two of the hand grip elements may be disposed next to different longitudinal sides or next to the same longitudinal side of the filter bellows. The symmetry or asymmetry of the filter element may be influenced with the hand grip elements in this way.

At least two of the hand grip elements may advantageously be disposed on diagonally opposite sides of the filter element with respect to the filter axis of the filter element. At least two hand grip elements may advantageously be disposed in the region of diagonally opposite side edges of the filter element. At least two hand grip elements may advantageously be disposed in the region of diagonally opposite side edges of the filter element. At least two hand grip elements may advantageously be disposed in the region of diagonally opposite corners of the oncoming flow side or the outgoing flow side.

At least two hand grip elements may also be disposed on opposite transverse sides, in particular front edge sides, in addition to being disposed on the same longitudinal side of the filter element.

In another advantageous embodiment, at least one of the hand grip elements may be disposed peripheral approximately at the center of one side of the filter element with respect to the axis of the element. At least one hand grip element may advantageously be disposed approximately centrally between two opposite sides, in particular longitudinal sides of the filter element.

In the case of another advantageous embodiment, the filter medium may be pleated. By pleating the filter medium, the ratio between the active filter area and the design volume of the filter bellows may be improved.

The filter medium may be pleated in a zigzag configuration to form the filter bellows. In the case of filter elements, in particular flat filter elements having an open filter bellows, the filter media are not closed. In other words, end pleats, like end edges, are not joined together. In contrast with that, in the case of hollow filter elements, in particular round filter elements, the filter media are shaped to form closed filter bellows, i.e., their end pleats are joined to one another. The end pleats are the two outermost pleats on opposite ends, in particular the longitudinal sides of the filter bellows. The end borders are the two free borders of the filter medium, which run along the end pleats and border them on the end sides of the filter bellows. The end edges of the filter bellows are the two other free borders of the filter bellows, which extend between the end borders and run according to the pleat in the filter bellows. The pleat edges are the edges along which the filter medium is pleated. In the case of cube-shaped filter bellows pleated in a zigzag pattern, the end borders and the pleat edges are straight and run in parallel to one another. The end edges run in a zigzag pattern and are perpendicular to the end borders of the pleat edges. The end edges each span one end edge of the filter bellows. In the case of a pleated filter medium, the oncoming flow side of the filter bellows is spanned by the pleat edges on the oncoming flow side. The outgoing flow side is spanned by the pleat edges of the filter bellows on the outgoing flow sides. The end edges are spanned by the end edges.

The filter bellows may advantageously have deep pleats. For example, this is the case with cube-shaped filter bellows, in particular when the pleat height is approximately at least as great as the extent in the direction of the pleat edges and/or in the direction across the pleat edges.

Varying pleat heights and/or pleat shapes may also be provided within the filter bellows. The pleat heights and/or pleat shapes may vary within at least one of the pleats. Alternatively or additionally, the pleat heights and/or pleat shapes may also vary between the pleats, in particular neighboring pleats. A curved shape of the oncoming flow side and/or of the outgoing flow side may be implemented in this way. The pleat heights at the center of the filter bellows may be smaller than those in the region of the longitudinal sides in particular. The corresponding side of the filter bellows, in particular the oncoming flow side or the outgoing flow side, may thus have a jacket shaped into an approximately ellipsoidal or circular cylinder. Alternatively, the filter bellows may also be graduated by appropriate variation in the filter heights.

In the case of another advantageous embodiment, at least one end body, in particular an end disk may be disposed on at least one peripheral side of the filter bellows, which extends between the oncoming flow side and the outgoing flow side. The filter bellows and the entire filter element can be stabilized with at least one end body. Furthermore, the filter bellows may be sealed in a particularly tight manner with at least one end body on the corresponding side. Furthermore, at least one end body may serve as a connecting element or as a retaining element with which the filter element can be positioned and held in a stable position in the filter housing.

Corresponding end bodies may advantageously be disposed on multiple peripheral sides of the filter bellows. The stability of the filter element can be further improved in this way.

One end body may advantageously be disposed on each of the opposing peripheral sides of the filter bellows. The end bodies may advantageously be situated on opposite sides of the filter bellows with respect to the axis of installation and/or the axis of the element.

In the case of a pleated filter medium, at least one end body may be situated on one end edge side of the filter bellows. At least one end body may be connected tightly to the end edge side. At least one end body may tightly seal the end edge side of the filter bellows in this way.

The two end edge sides of the filter bellows may advantageously each be sealed with an end body.

At least one end body may advantageously be an end disk. An end disk is flat in relation to its extent. The need for installation space of the filter element can be reduced on the whole in this way.

At least one end body, in particular the end disk may be provided with a rib structure with which the stability of the end body can be increased.

A boundary shape of at least one end body may correspond to a corresponding boundary shape of the filter bellows on the side where at least one end body is disposed. The shape of the end body may be adapted to a variation in the extent, in particular the height of the filter bellows, in particular a variation in the pleat heights.

At least one end body may advantageously be made of plastic. Plastic can be elastic. At least one end body made of plastic may have a mechanically damping effect in particular. Furthermore, plastic can be shaped easily, in particular by being cast or injection molded.

At least one end body, in particular the end body made of plastic, may advantageously be joined to the filter bellows in a materially bonded manner, in particular by welding or adhesive bonding, in a form-fitting manner, in particular by means of a plug connection or a catch connection and/or in a force-locking manner, in particular by means of a press-fit connection or a clamped connection or in some other way.

In the case of another advantageous embodiment, at least one of the hand grip elements may be connected in one piece to at least one end body in particular. At least one hand grip element can be manufactured easily together with the corresponding end body in this way, in particular by prefabrication. At least one end body with at least one hand grip element may easily be connected to the filter medium. This may advantageously be performed in one operation.

At least one hand grip element and at least one end body may advantageously be joined to one another in one piece. The stability can be increased with a one-piece connection. Additional fastening elements or additional assembly steps for joining at least one hand grip element to at least one end body may then be omitted.

At least one end body together with at least one hand grip element may easily and advantageously be made of plastic, in particular by injection molding or casting.

At least one hand grip element may advantageously be integrated into the end body, in particular the end disk. A space-saving and stable construction can be obtained in this way.

At least one hand grip element may advantageously be disposed centrally on one side of at least one end body. Uniform mechanical forces may be exerted on the filter element during installation or dismantling in this way. The risk of tilting of the filter element may thus be further reduced.

In another advantageous embodiment, at least one longitudinal section of at least one of the hand grip elements may extend in at least one direction parallel to the installation direction, in which the filter element can be installed in the filter housing, in particular the axis of the element.

At least one longitudinal section may serve as a connecting section for connection of a transverse section that is optionally present, in particular a grip section of at least one hand grip element, to the filter bellows or the end body.

Alternatively or additionally, at least one longitudinal section may serve as a supporting section or a stabilizing section of any transverse section that might be present, in particular a transverse web with respect to the filter bellows or the end body. Therefore, during installation or dismantling of the filter element, forces acting on the transverse section can be transferred better to the filter bellow or to the end body.

At least one of the hand grip elements, in particular at least one longitudinal section, may advantageously protrude beyond the filter bellows on the oncoming flow side or the outgoing flow side, in particular in the direction of the axis of the element and/or in the installation direction. In this way at least one hand grip element can easily be gripped in the main direction of flow of the fluid upstream from the oncoming flow side or downstream from the outgoing flow side.

At least one of the hand grip elements may advantageously be situated within a range spanned by the end body as seen in the direction of installation. At least one hand grip element does not have a negative effect on the lateral extent of the filter element in this way. The lateral installation space of the filter element can be reduced in this way.

At least one longitudinal section may advantageously border at least partially a hole or a finger hole of the corresponding hand grip element.

In another advantageous embodiment, at least one transverse section of at least one of at least two hand grip elements may extend in at least one direction component transversely, in particular radially to the installation direction in which the filter element can be installed in the filter housing, in particular an axis of the element.

At least one transverse section may be acted upon easily and uniformly with forces in or against the direction of installation. At least one transverse section may serve as a grip section or as a grip web.

At least one transverse section may advantageously extend away from the filter bellows with at least one direction component.

At least one hand grip element may advantageously have a web, a journal or a rib. A web, a journal or a rib can be implemented easily. Such hand grip elements can be gripped easily.

At least one hand grip element may advantageously be disposed on the outside of at least one end body facing away from the filter bellows. At least one hand grip element advantageously does not protrude beyond the filter bellows on the oncoming flow side or the outgoing flow side. The extent of the filter element in the main direction of flow and/or in the direction of the axis of the element and/or in the installation direction can be reduced in this way.

Alternatively, at least one of the hand grip elements may be designed as a retaining handle. The grip section of the handle may extend transversely to the installation direction and/or the element axis. The grip section may be connected to the filter bellows or optionally to at least one end body by means of at least one lateral connecting section. The grip section and the lateral connecting sections may implement a hole or a finger hole, in particular bordering them.

In another advantageous embodiment, at least one of the hand grip elements may be attached to the filter element at a position laterally to the oncoming flow side and/or the outgoing flow side. The coverage of the oncoming flow side and/or the outgoing flow side by at least one hand grip element can be reduced in this way. This also makes it possible to reduce interference in the flow through the filter element.

In another advantageous embodiment, the filter element may have a filter element holding device which may be connected directly or indirectly to the filter bellows extending between the oncoming flow side and the outgoing flow side along at least a part of the circumference of the filter bellows and optionally having at least one retaining configuration that protrudes away from the filter bellows transversely, in particular radially, to the installation direction. The filter element can be secured easily with the filter element holding device in a corresponding counter holding device of the filter housing. The filter element can be positioned easily in the filter housing in this way. Due to the fact that the filter element retaining device extends at least along a portion of the circumference and has retaining configurations protruding radially to the installation direction, axial positioning and retaining in the filter housing are possible with respect to the direction of installation and/or the element axis.

The filter element retaining device may advantageously be connected to at least one end body. The transfer of force from the filter housing to the filter bellows and vice versa can thereby be improved.

In another advantageous embodiment, at least one of the hand grip elements may be flush with at least one retaining configuration as seen in the installation direction of the filter element in the filter housing. "Flush" in the sense of the present invention means that there is a projection of at least one hand grip element in the installation direction at least partially, preferably completely, within at least one retaining configuration.

At least one hand grip element may advantageously be disposed in a region of the filter element in which the filter element is widened laterally anyway because of at least one retaining configuration, in particular being widened radially to the installation direction. It is possible in this way to achieve the result that the lateral extent of the filter element is not further increased by the at least one hand grip element. If the filter housing takes up only a small amount of space, at least one hand grip element may be formed as a type of rib, web or journal laterally with respect to the installation direction in front of or behind the laterally protruding retaining configuration.

Furthermore, the object is achieved according to the invention with a filter, in that the filter element has at least two hand grip elements for gripping the filter element.

The advantages and features presented above in conjunction with the filter element according to the invention and, accordingly, its advantageous embodiments apply to the filter according to the invention and vice versa.

BRIEF DESCRIPTION OF THE DRAWINGS

Additional advantages, features and details of the invention are derived from the following description, in which exemplary embodiments of the invention are described in greater detail with reference to the drawings. Those skilled in the art will expediently also consider individually the features that are disclosed in combinations in the drawings, the description and the claims and will combine them into reasonable further combinations. The drawings show schematically:

The same parts in the figures are labeled with the same reference numerals.

EXEMPLARY EMBODIMENTS OF THE INVENTION

FIGS. 1 to 4 show a filter element 10 of an air filter, which is not shown otherwise, of an internal combustion engine of a motor vehicle according to a first exemplary embodiment, illustrated from various perspectives. The air filter comprises a filter housing that can be opened and is comprised of a housing pot and a housing cover. The filter element 10 is disposed in the filter housing and can be replaced.

An installation direction 12 of the filter element 10 in the housing pot runs parallel to the element axis 14 in the exemplary embodiment shown here.

The filter element 10 can be inserted into the housing pot through an installation opening.

The filter element 10 is designed as a flat filter element. The filter element 10 comprises filter bellows 16 made of a filter medium 18 pleated in a zigzag pattern, the bellows being approximately cube-shaped on the outside. The filter medium 18 may be filter paper, filter nonwoven or some other pleatable filter medium suitable for filtering air. A filter bellows 16 may also be made of an unpleated filter medium, for example, a filter foam. The filter medium 18 is pleated along pleat edges 20. The pleat edges 20 run parallel to one another and perpendicular to the element axis 14.

Figures 1, 2:
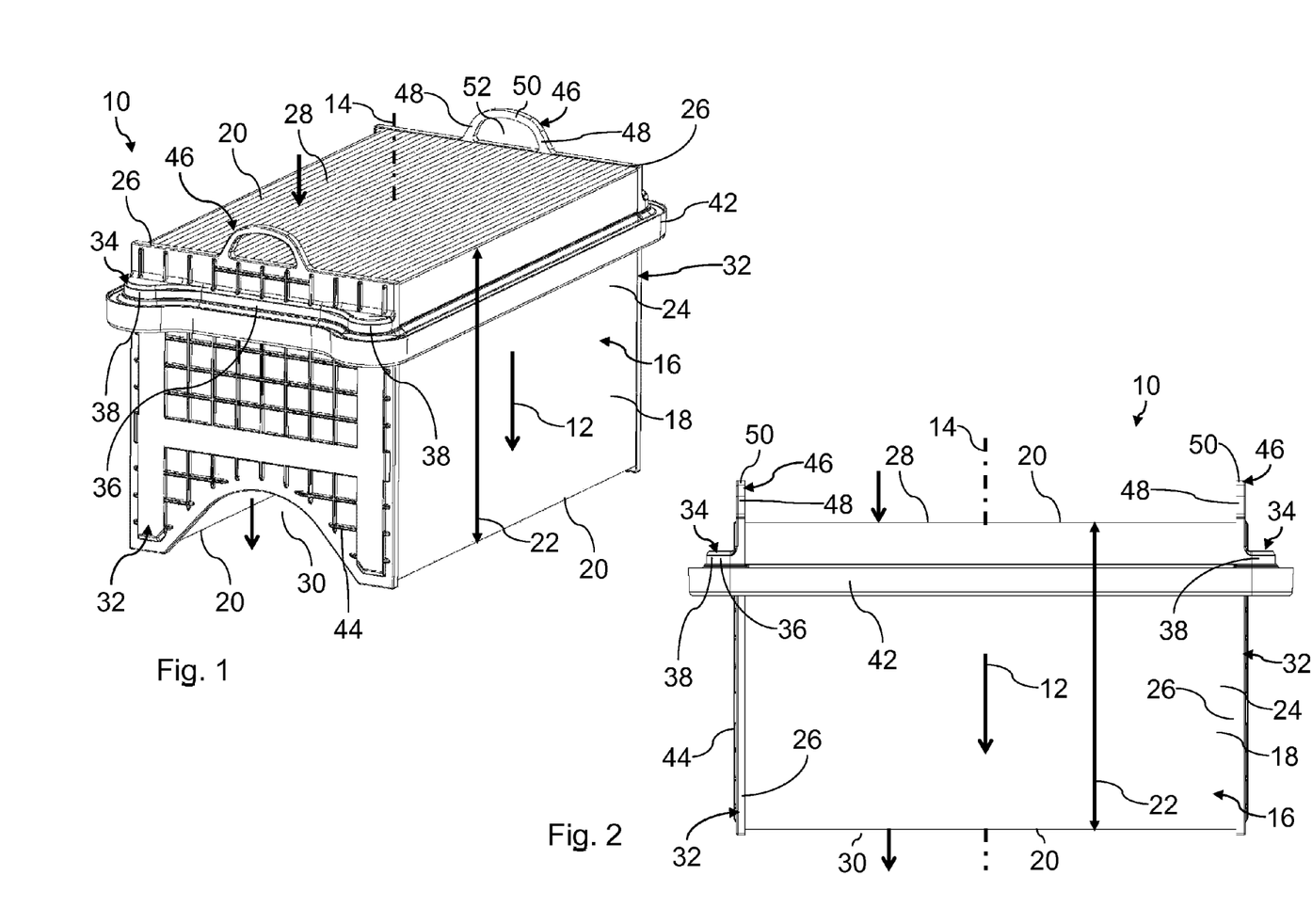
FIG. 1 an isometric diagram of an air filter element according to a first exemplary embodiment, with end disks on opposite sides and with a holding handle being integrated into each.
FIG. 2 the filter element from FIG. 1 in a longitudinal side view.
Figure 3:
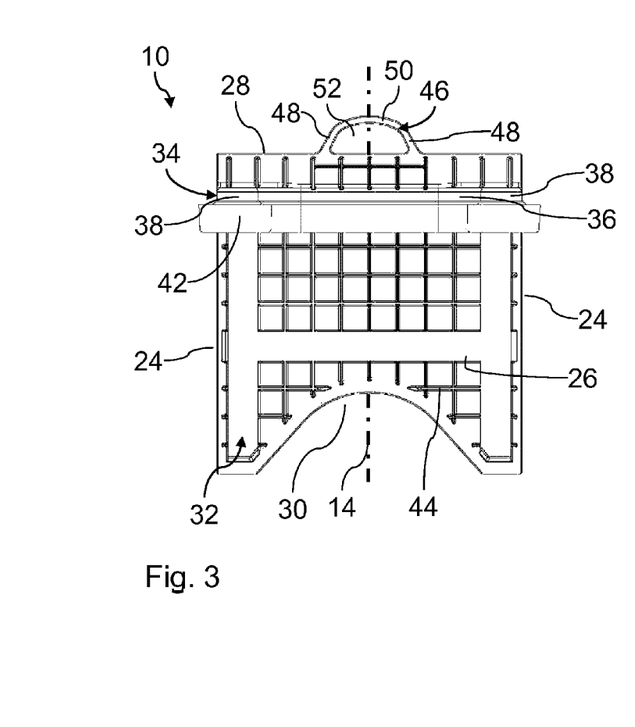
FIG. 3 the filter element from FIGS. 1 and 2 in a transverse sectional view with the direction of observation aimed at one of the end disks.
Figure 4:
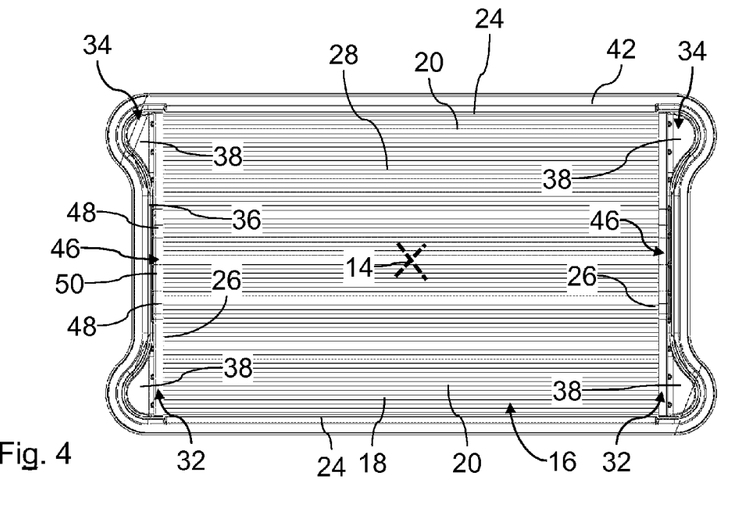
FIG. 4 the filter element from FIGS. 1 to 3 in a view from above on an oncoming flow side.
Figure 5:
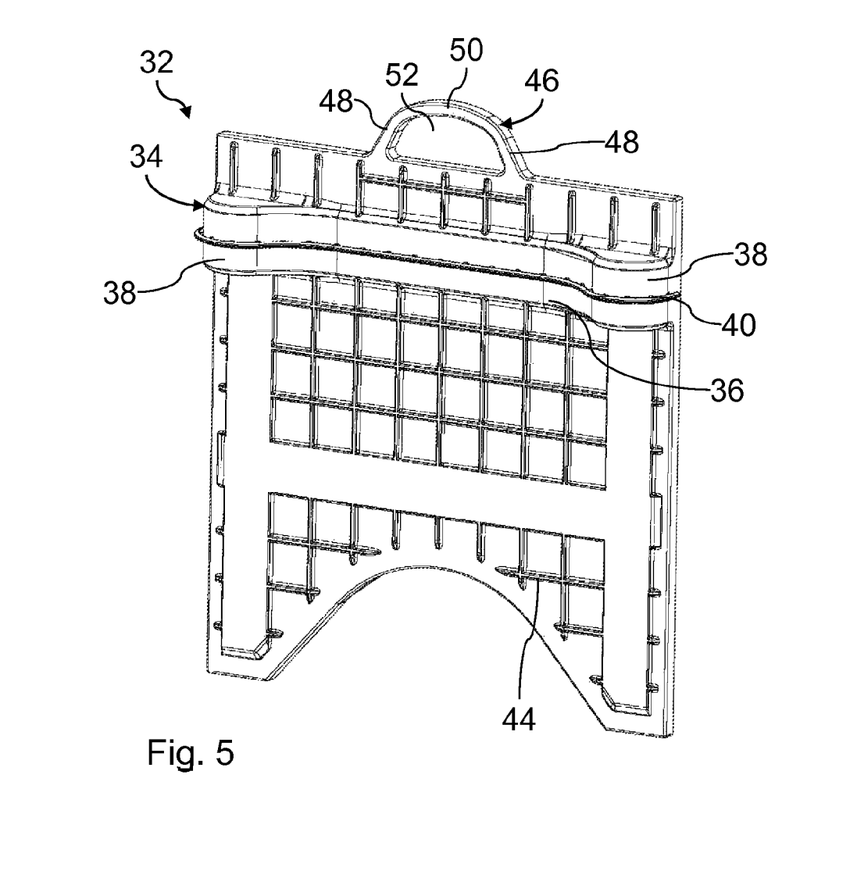
FIG. 5 an isometric diagram of one of the end disks of the filter element from FIGS. 1 to 4.
Figure 6:
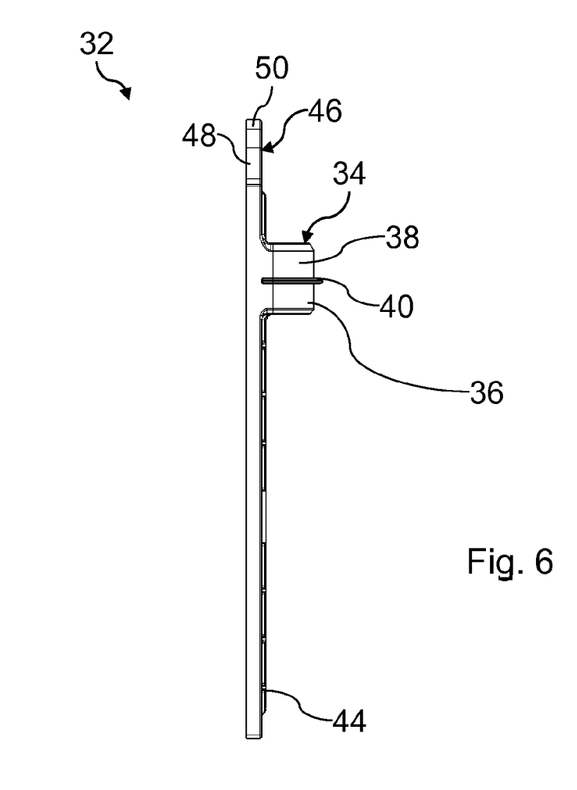
FIG. 6 a side view of the end disk from FIG. 5.
Figure 7:
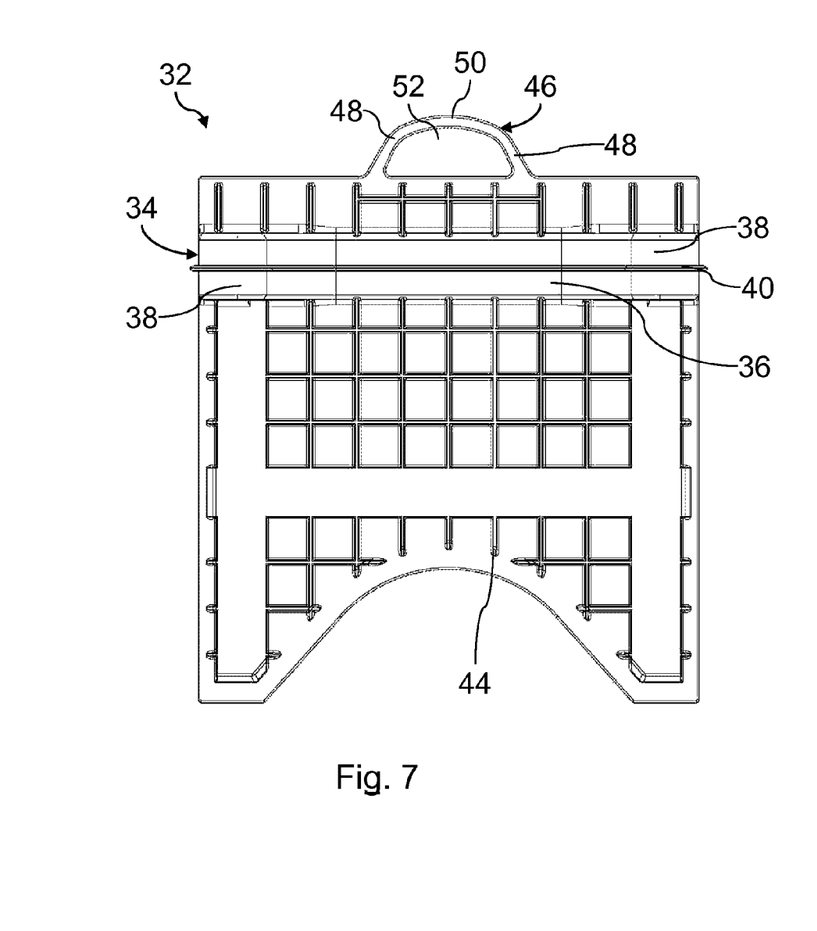
FIG. 7 a frontal view of the end disk from FIGS. 5 and 6.
Figure 8:
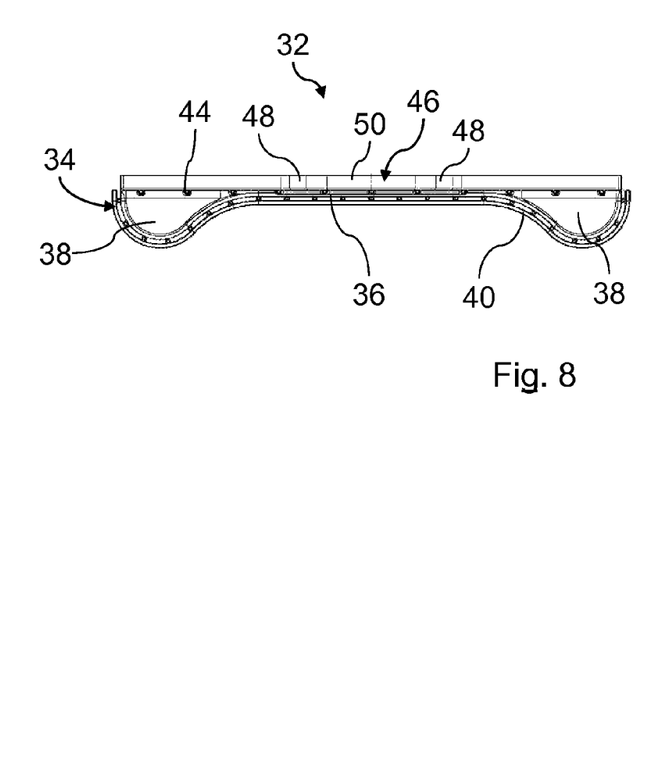
FIG. 8 a top view of the end disk from FIGS. 5 to 7.
Figures 9, 10:
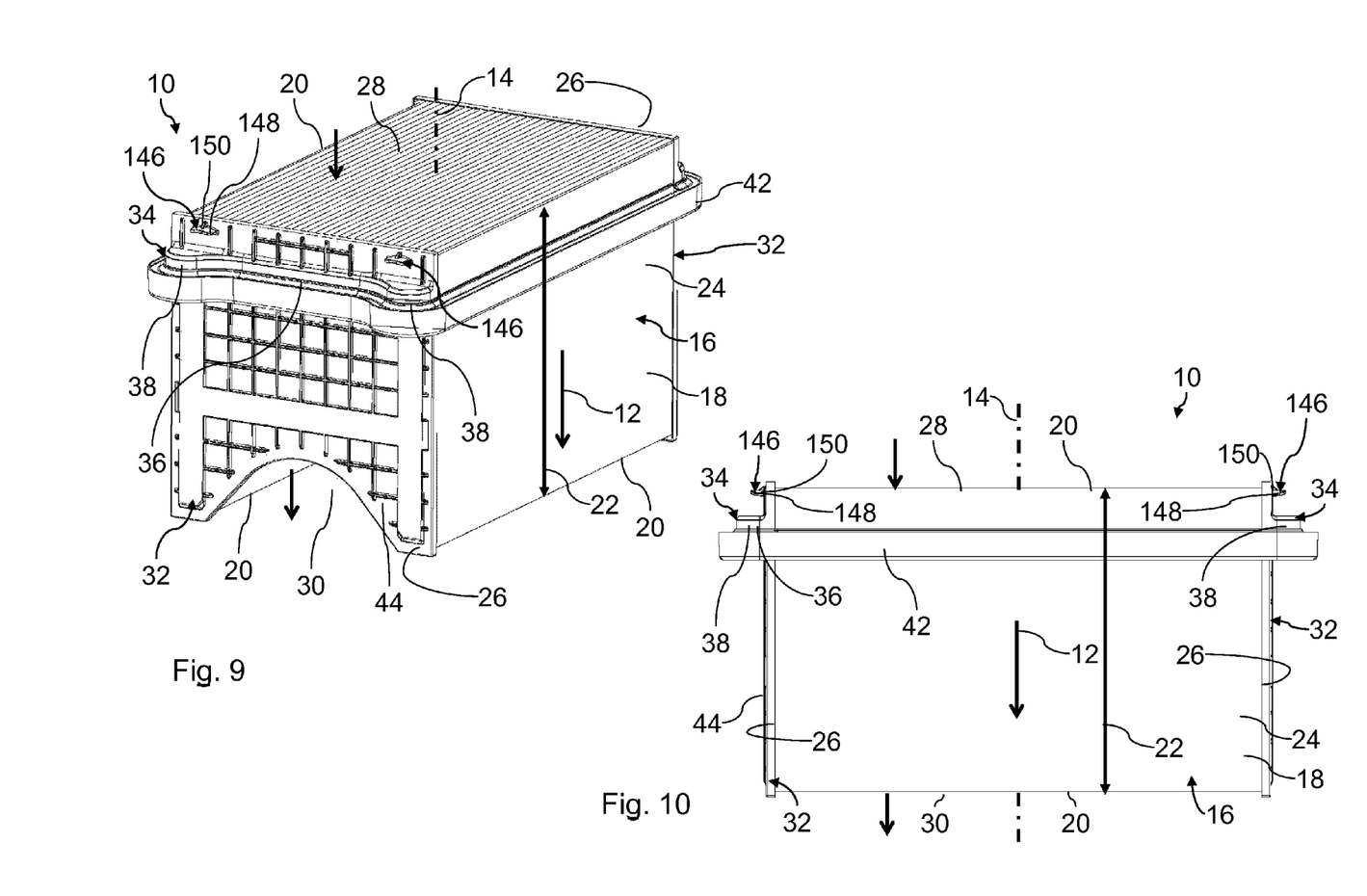
FIG. 9 an isometric diagram of an air filter element according to a second exemplary embodiment, with end disks on opposite sides, with two rib-type hand grip elements integrated into each.
FIG. 10 the filter element from FIG. 9 in a longitudinal view.
Figure 11:
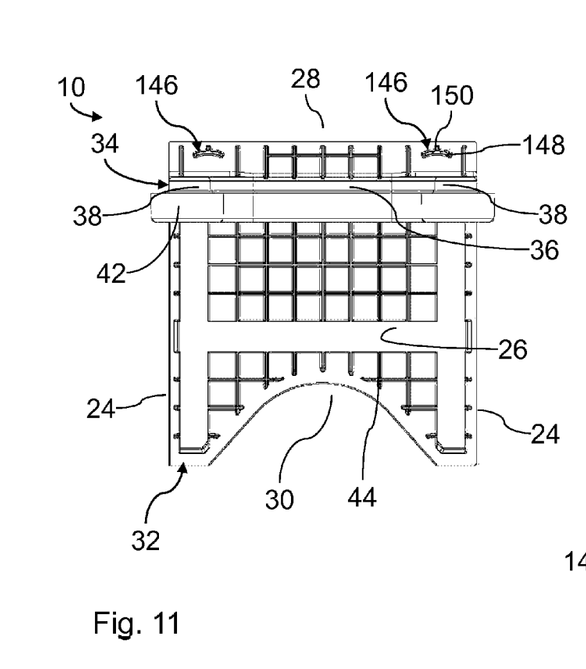
FIG. 11 the filter element from FIGS. 9 and 10 in transverse view.
Figure 12:
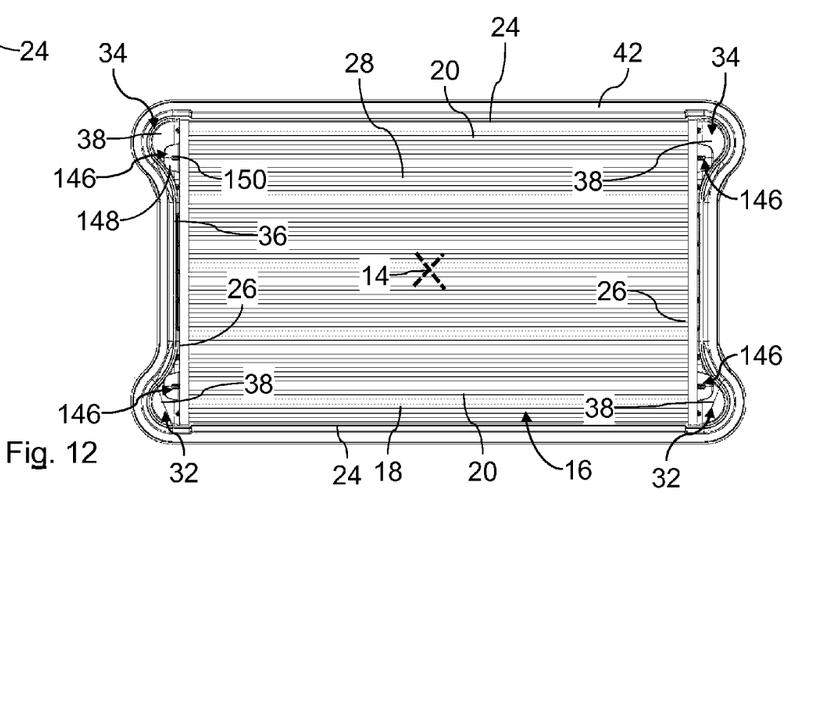
FIG. 12 the filter element from FIGS. 9 to 10 in a top view.
Figure 13:
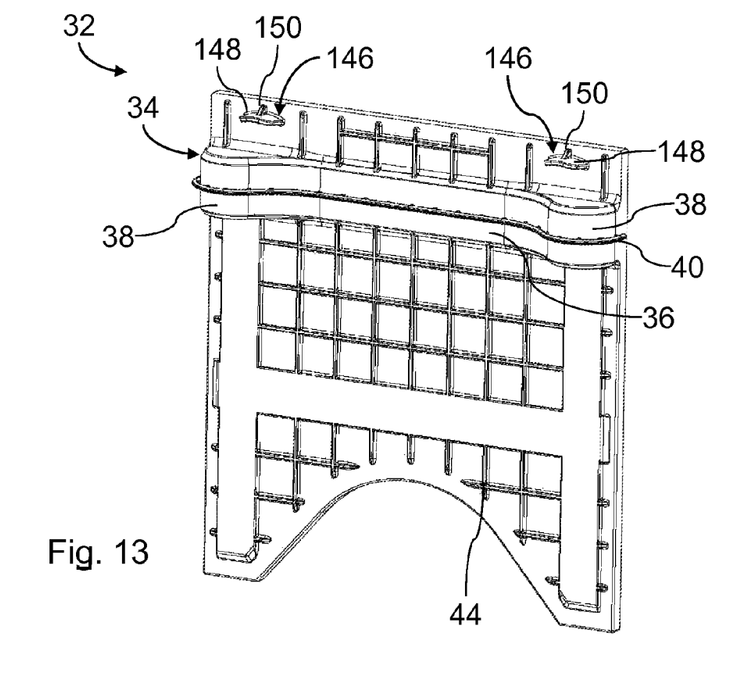
FIG. 13 an isometric diagram of one of the end disks of the filter element from FIGS. 9 to 12.
Figure 14:
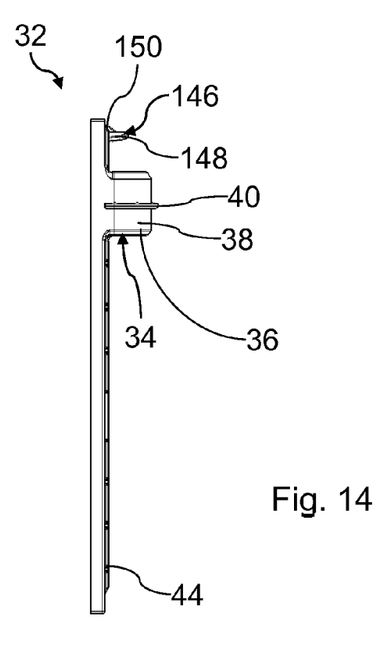
FIG. 14 a side view of the end disk from FIG. 13.
Figure 15:
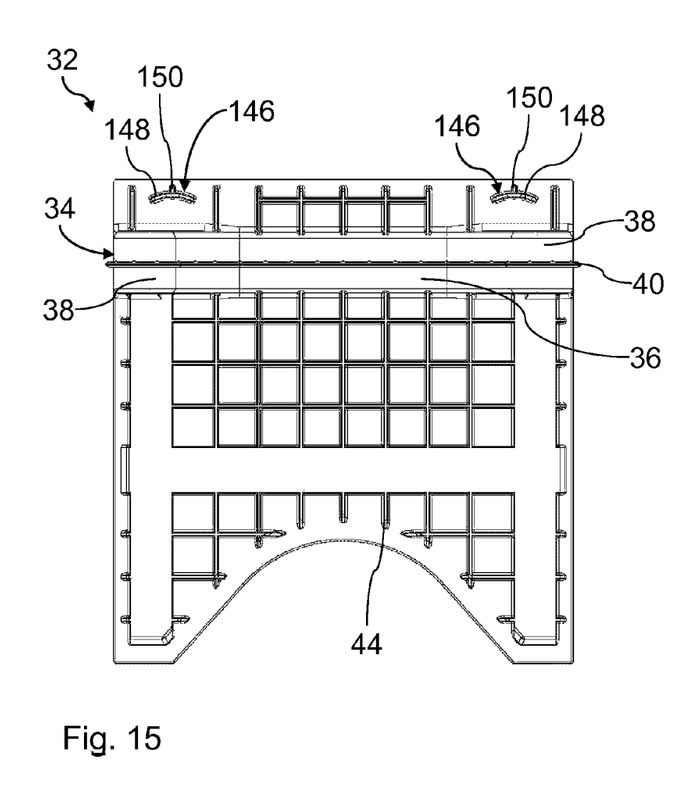
FIG. 15 a frontal diagram of the end disk from FIGS. 13 and 14.
Figure 16:
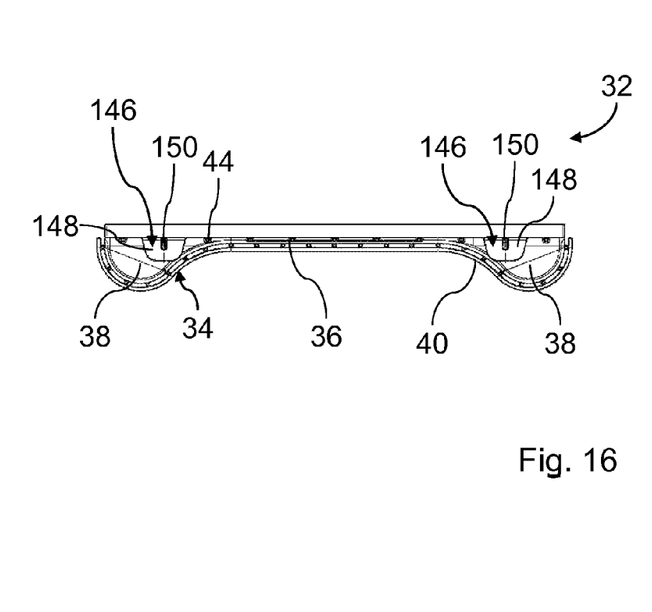
FIG. 16 a top view of the end disk from FIGS. 13 to 15.

FIGS. 1 and 2 show pleat edges 20 on the oncoming flow side at the top and pleat edges 20 on the outgoing flow side at the bottom. FIG. 4 shows only the pleat edges 20 on the oncoming flow side. Pleat heights 22 of the pleated filter medium 18 extend parallel to the element axis 14. The width of the filter bellows 16 perpendicular to the pleat edges 20 is smaller than its length in the direction of the pleat edges 20. The axial height of filter bellows 16 with respect to the element axis 14 is somewhat greater at its highest point than the width of the filter bellows 16. The length of the filter bellows 16 is greater than its greatest height. The pleats may therefore be described as deep.

The pleat heights 22 of the pleats vary from one pleat to the next in the direction perpendicular to the pleat edges 20 and perpendicular to the element axis 18. The pleat heights 22 of the pleats at the center of the filter bellows 16 are smaller than the pleat heights 22 of the outer pleats on the longitudinal sides 24 of the filter bellows 16. The shape of a curve through the pleat edges 20 on the outgoing flow side, shown at the bottom of FIG. 1, as seen in the longitudinal direction of the filter bellows 16, corresponds approximately to a parabolic shape.

End edge sides 26 of the filter bellows 16 are spanned by the end edges of the filter medium 18, which are concealed in the figures. The end edge sides 26 are situated on radially opposite sides with respect to the element axis 14. The end edge sides 26 run parallel to one another and perpendicular to the oncoming flow side 28 which is spanned by the element axis 14 and the pleat edges 20 on the oncoming flow side. The end edge sides 26 connect the longitudinal sides 24 and, together with them, form the periphery of the filter bellows 16.

The oncoming flow side 28, shown at the top of FIGS. 1 to 4, is situated on the side facing the housing cover when the filter element 10 is installed.

The outgoing flow side 30, shown at the bottom of FIGS. 1 to 4, is spanned by the pleat edges 20 on the outgoing flow side on the side facing the pot bottom of the housing pot.

An end disk 32 is connected tightly to the end edges of the filter medium 18 on the end edge sides 26 of the filter bellows 16. FIGS. 5 to 8 show one of the end disks 32 is shown in different perspectives, for example. The end disks 32 are each made of plastic. The end disks 32 are approximately rectangular on the outside. Their lower borders on the outgoing flow side facing the outgoing flow side 28 run approximately in the form of a parabola in accordance with the outgoing flow side 28.

In the vicinity of the oncoming flow border, each end disk 32 has a filter element retaining device 34. The filter element retaining device 34 comprises a protrusion 36 in one piece. The protrusion 36 extends peripherally with respect to the element axis 14. It extends outward from the filter bellows 16, as seen in the direction of the pleat edges 20, and approximately parallel to the border on the oncoming flow end of the end disks 32.

In the region of their ends facing the longitudinal sides 24, the protrusions 36 each have a retaining configuration 38 which protrudes outward as seen from the filter bellows 16. Each protrusion 36 also has a retaining web 40 for a seal 42 approximately at the center as seen in the installation direction 12. The retaining web 40 extends over the entire length of the protrusion 36.

The seal 42 surrounds the filter bellows 16 and the end disks 32 so that it is closed on the periphery with respect to the element axis 14. The seal is situated slightly behind the pleat edges 20 on the oncoming flow side, as seen from the oncoming flow side 28.

With the help of the filter element retaining device 34, the filter element 10 can be retained in the filter housing axially with respect to the installation direction 12 and the element axis 14. The filter housing therefore has corresponding retaining surfaces for the filter element retaining device 34.

Furthermore, each end disk 32 is provided with reinforcing ribs 44 on their outsides facing away from the filter bellows 16, such that the reinforcing ribs are disposed in a rib-type pattern.

A holding handle 46 is attached in one piece to the respective borders of the end disk 32 on the oncoming flow side facing the oncoming flow side 28. The holding handles 46 are situated approximately at the center with respect to the width of the filter bellows 16. The two holding handles 46 are disposed on the filter element 10 on radially opposite sides with respect to the element axis 14. The holding handles 46 each extend in the plane of the corresponding end disk 32. The holding handles 46 are each situated at the side of the oncoming flow side 28. In this way the holding handles 46 do not conceal the oncoming flow side 28. The retaining handles 46 protrude beyond the filter bellows 16 on the oncoming flow side 28.

Lateral connecting sections 48 of the retaining handles 46 extend with one direction component approximately parallel to the element axis 14, i.e., parallel to the installation direction 12. A central grip section 50 extends transversely to the element axis 14, i.e., transversely to the installation direction 12 and transversely to the pleat edges 20. This central grip section 50 connects the two connecting sections 48.

The lateral connecting sections 48, the grip section 50 and the corresponding border on the oncoming flow end of the end disk 32 opposite the grip section 50 border a finger hole 52 of the corresponding retaining handle 46.

The filter element 10 may be gripped with one hand or with a corresponding tool on the opposite sides, for example, by the two retaining handles 46. The filter element 10 may thus be inserted into the filter housing for installation in the installation direction 12 and for dismantling it can be removed accordingly in the opposite direction by the retaining handles 46.

FIGS. 9 to 12 show a second exemplary embodiment of the filter element 10. One of the end disks 32 of the filter element 10, for example, is shown in the detail in FIGS. 13 to 16. In contrast with the first exemplary embodiment, in the second exemplary embodiment, instead of the retaining handles 46, two rib-type hand grip elements 146 are disposed on each of the end disks 32. Otherwise the design of the filter element 10 according to the second exemplary embodiment from FIGS. 9 to 16 corresponds to the design of the filter element 10 according to the first exemplary embodiment from FIGS. 1 to 8.

The hand grip elements 146 are situated between the holding configurations 38 and the oncoming flow border of the end disks 32 as seen in the direction of the element axis 14. Each hand grip element 146 is flush in the direction of the element axis 14, i.e., also as considered in the installation direction 12 with one of the retaining configurations 38.

The hand grip elements 146 each have a web grip 148 which extends outward approximately parallel to the oncoming flow side 28 and perpendicular to the outside of the end disk 32. The web grips 148 are somewhat curved, so that they form a slight recessed grip on their bottom side facing the corresponding retaining configuration 38. It is readily possible to grip this recessed grip using one's fingers or a tool.

The hand grip elements 146 each have a supporting web 150 on the side facing the oncoming flow border of the end disk 32. The supporting webs 150 grip approximately centrally on the side of the web grips 148 on the oncoming flow side and extend approximately parallel to the element axis 14. They serve to support the web grips 148. The hand grip elements 146 are each situated laterally to the oncoming flow side 28.

Thus, on the whole, four hand grip elements 146 are disposed on the periphery on opposite sides of the filter element 10.

The invention claimed is:

1. A flat filter element (10) for installation in a filter housing of a filter for fluid,
    an open filter bellows (16) of a pleated filter medium (18) which is folded into a first set of pleat edges (20) at an oncoming flow side (28) and folded into a second set of pleat edges at an outgoing flow side (30) for the fluid to be filtered,
    wherein the first and second set of pleat edges extend from a first end edge side (26) of the open filter bellows to an opposing second edge side of the open filter bellows,
    wherein the filter element has an element axis extending through the open filter bellows from the oncoming flow side to the outgoing flow side and aligned with an installation direction of the filter element and a direction of fluid flow through the filter element,
    a first end disk arranged directly on the first end edge side (26) of the open filter bellows and extending from the oncoming flow side (28) to the outgoing flow side (30),
    a second end disk arranged directly on the second end edge side (26) of the open filter bellows and extending from the oncoming flow side (28) to the outgoing flow side (30),
    wherein the filter element (10) has at least two hand grip elements (46; 146) for gripping the filter element (10), each attached directly to and formed in one piece with a respective one of the end disks,
    wherein at least one of the at least two hand grip elements (46) has at least one hole or at least one finger hole (52) or at least one grip opening or at least one recessed grip,
    wherein at least two hand grip elements (46; 146) are disposed on opposite sides (26) of the filter element (10).

2. The filter element according to claim 1, wherein at least two different longitudinal sides next to the hand grip elements or next to the same longitudinal side of the filter bellows are disposed there.

3. The filter element according to claim 1, wherein at least one of the hand grip elements (46) is disposed on the periphery approximately at the center of one side (26) of the filter element (10) with respect to the element axis (14).

4. The filter element according to claim 1, wherein at least one longitudinal section (48; 150) of at least one of the hand grip elements (46; 146) extends with at least one direction component parallel to the installation direction (12) in which the filter element (10) can be installed in the filter housing.

5. The filter element according to claim 1, wherein at least one transverse section (50; 148) of at least one of at least two hand grip elements (46; 146) extends with at least one direction component radially to the installation direction (12) in which the filter element (10) can be installed in the filter housing.

6. The filter element according to claim 1, wherein at least one of the hand grip elements (46; 146) projects laterally outwardly at the oncoming flow side (28) or the outgoing flow side.

7. The filter element according to claim 1, wherein the filter element (10) has a filter element retaining device (34) formed on at least one of the end disks, the filter element retained device extending completely across the at least one of the end disks, arranged between the oncoming flow side (28) and the outgoing flow side (30), and
has at least one retaining configuration (38) formed as a bulge to the filter element retraining device and protruding away from the filter bellows radially to the installation direction (12).

8. The filter element according to claim 7, wherein at least one of the hand grip elements (146) is flush with at least one retaining configuration (38), as viewed in a direction (12) of installation of the filter element (10) into the filter housing.

9. An air filter for an internal combustion engine, comprising
    a filter housing, which has at least one inlet and at least outlet for liquid, and having at least one filter element according to claim 1,
    wherein the filter element is a flat filter element (10) with an open filter bellows (16) made of a filter medium (18), which has an oncoming flow side (28) and an outgoing flow side (30) for the fluid to be filtered,
    wherein at least one filter element (10) is disposed in the filter housing in such a way that it separates at least one inlet from at least one outlet,
    wherein the filter element (10) has at least two hand grip elements (46; 146) for gripping the filter element (10).

* * * * *